(12) United States Patent
Barreto et al.

(10) Patent No.: US 10,260,567 B2
(45) Date of Patent: Apr. 16, 2019

(54) COUPLING SHAFTS IN AXIAL ALIGNMENT

(71) Applicant: Barreto Manufacturing, Inc., Salem, OR (US)

(72) Inventors: Lucas Barreto, La Grande, OR (US); Greg Barreto, La Grande, OR (US)

(73) Assignee: Barreto Manufacturing, Inc., La Grande, OR (US)

( * ) Notice: Subject to any disclaimer, the term of this patent is extended or adjusted under 35 U.S.C. 154(b) by 189 days.

(21) Appl. No.: 15/400,792

(22) Filed: Jan. 6, 2017

(65) Prior Publication Data

US 2017/0191531 A1 Jul. 6, 2017

Related U.S. Application Data

(60) Provisional application No. 62/275,548, filed on Jan. 6, 2016.

(51) Int. Cl.

| | |
|---|---|
| *F16D 1/02* | (2006.01) |
| *G01B 5/25* | (2006.01) |
| *F16C 19/54* | (2006.01) |
| *F16D 1/08* | (2006.01) |
| *F16C 19/06* | (2006.01) |

(52) U.S. Cl.
CPC ............... *F16D 1/02* (2013.01); *F16C 19/06* (2013.01); *F16C 19/546* (2013.01); *F16D 1/0876* (2013.01); *G01B 5/25* (2013.01); *F16C 2361/41* (2013.01)

(58) Field of Classification Search
CPC .................................... F16D 1/02; G01B 5/25
USPC ...................... 33/412, 645, 533; 403/361, 26
See application file for complete search history.

(56) References Cited

U.S. PATENT DOCUMENTS

| | | | | |
|---|---|---|---|---|
| 3,970,398 A | * | 7/1976 | Wilson | F01D 5/026 403/26 |
| 4,832,659 A | * | 5/1989 | Nelson | F16D 3/10 403/26 |
| 5,956,953 A | * | 9/1999 | Folsom | F16H 39/20 60/487 |
| 7,430,942 B1 | * | 10/2008 | Poplawski | B60K 17/10 180/905 |
| 8,689,455 B2 | * | 4/2014 | Smith | F01D 25/285 33/412 |
| 2006/0228228 A1 | * | 10/2006 | Wesolowski | F02B 63/00 417/234 |

(Continued)

*Primary Examiner* — Christopher W Fulton
(74) *Attorney, Agent, or Firm* — Klarquist Sparkman, LLP

(57) ABSTRACT

Disclosed systems couple two rotational shafts in axial alignment with each other such that torque can be transferred between the shafts without undesired loading occurring. A shaft coupling system can include an annular mounting housing positioned around a juncture of two rotational shafts with bearings positioned between the shafts and the housing so that the housing prevents radial motion of the shafts while allowing the shafts to rotate about their common axis. One shaft can be coupled to an engine and the other shaft can be coupled to a shaft-driven device such as a hydraulic pump. One shaft can be smaller in diameter and piloted into a recess in the end of the other shaft. In some embodiments, the two shafts have about the same diameter and are linked via a torque coupler within an annular mounting housing that allows rotation but limits radial motion of the shafts.

16 Claims, 10 Drawing Sheets

(56) References Cited

U.S. PATENT DOCUMENTS

| | | | |
|---|---|---|---|
| 2007/0022751 A1* | 2/2007 | Galba | F04B 1/22 60/489 |
| 2010/0101810 A1* | 4/2010 | Harnetiaux | B60K 25/06 172/1 |
| 2012/0217079 A1* | 8/2012 | Besler | B60B 35/16 180/233 |
| 2015/0298544 A1* | 10/2015 | Amerla | B60K 23/08 74/405 |

* cited by examiner

COUPLING SHAFTS IN AXIAL ALIGNMENT

CROSS-REFERENCE TO RELATED APPLICATION

This application claims the benefit of U.S. Provisional Patent Application No. 62/275,548, filed Jan. 6, 2016, which is incorporated by reference herein in its entirety.

FIELD

This application is related to devices for coupling torque transmitting shafts together in axial alignment.

BACKGROUND

When coupling two rotating shafts end-to-end, any axial misalignment between the two shafts can induce an undesired load in the shafts. Such a load can be further transmitted to other components coupled to the shafts, such as bearings and seals. When the rotation of misaligned shafts produces undesired loading cycles, the shafts and other associated components coupled to the shafts are then at risk of damage and failure. Therefore, it is desirable to reduce or eliminate axial misalignment between the shafts.

SUMMARY

Described herein are embodiments of devices, systems, and methods for coupling two rotational shafts in axial alignment with each other such that torque can be transferred between the shafts without undesired loading occurring. In disclosed examples, a shaft coupling system includes an annular mounting housing that is positioned around a juncture of two rotational shafts with bearings positioned between the shafts and the housing so that the housing prevents radial motion of the shafts while allowing the shafts to rotate about their common axis. One shaft can be coupled to an engine and the other shaft can be coupled to a shaft-driven device such as a hydraulic pump that is driven by rotation of the shaft via torque produced by the engine. Both the engine and the pump, or analogous devices, can be fixed to a common platform or base structure to prevent unwanted loading on the shafts caused by gravity. The mounting housing can also be fixed to the common platform to prevent radial motion of the housing and thereby limit any radial motion of the shafts. In some embodiments, one shaft is smaller in diameter and is piloted into a recess in the end of the other shaft, while in other embodiments the two shafts can have about the same diameter and be linked via a torque coupler within an annular mounting housing that allows rotation of the shafts but limits radial motion of the shafts.

The foregoing and other objects, features, and advantages of the disclosed technology will become more apparent from the following detailed description, which proceeds with reference to the accompanying figures.

DETAILED DESCRIPTION

Figure 1:
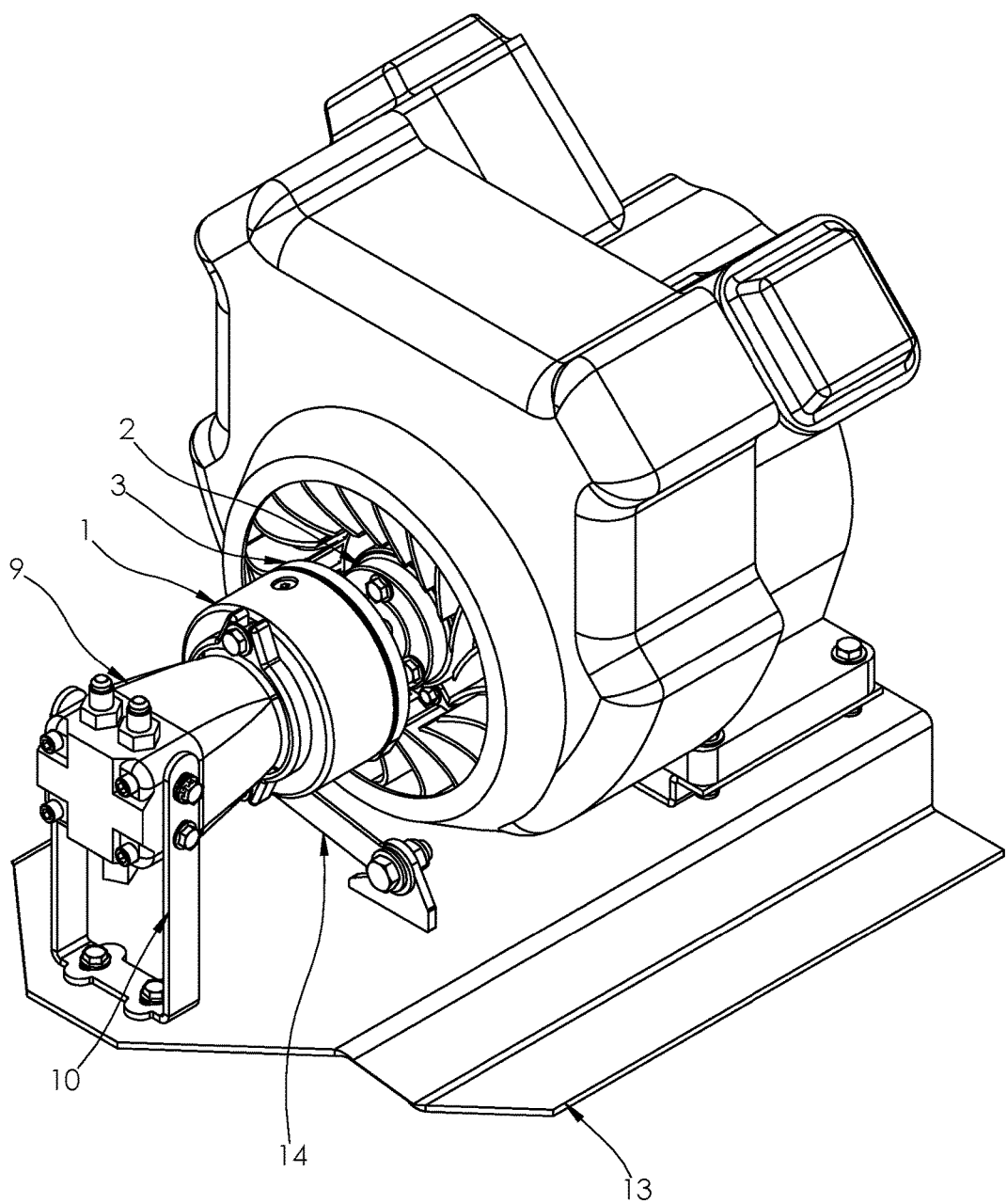
FIGS. 1 and 2 are perspective views of a system comprising a hydraulic pump and an engine, wherein a shaft of the pump is coupled to a stub shaft of the engine with an exemplary shaft coupling device.
Figure 2:
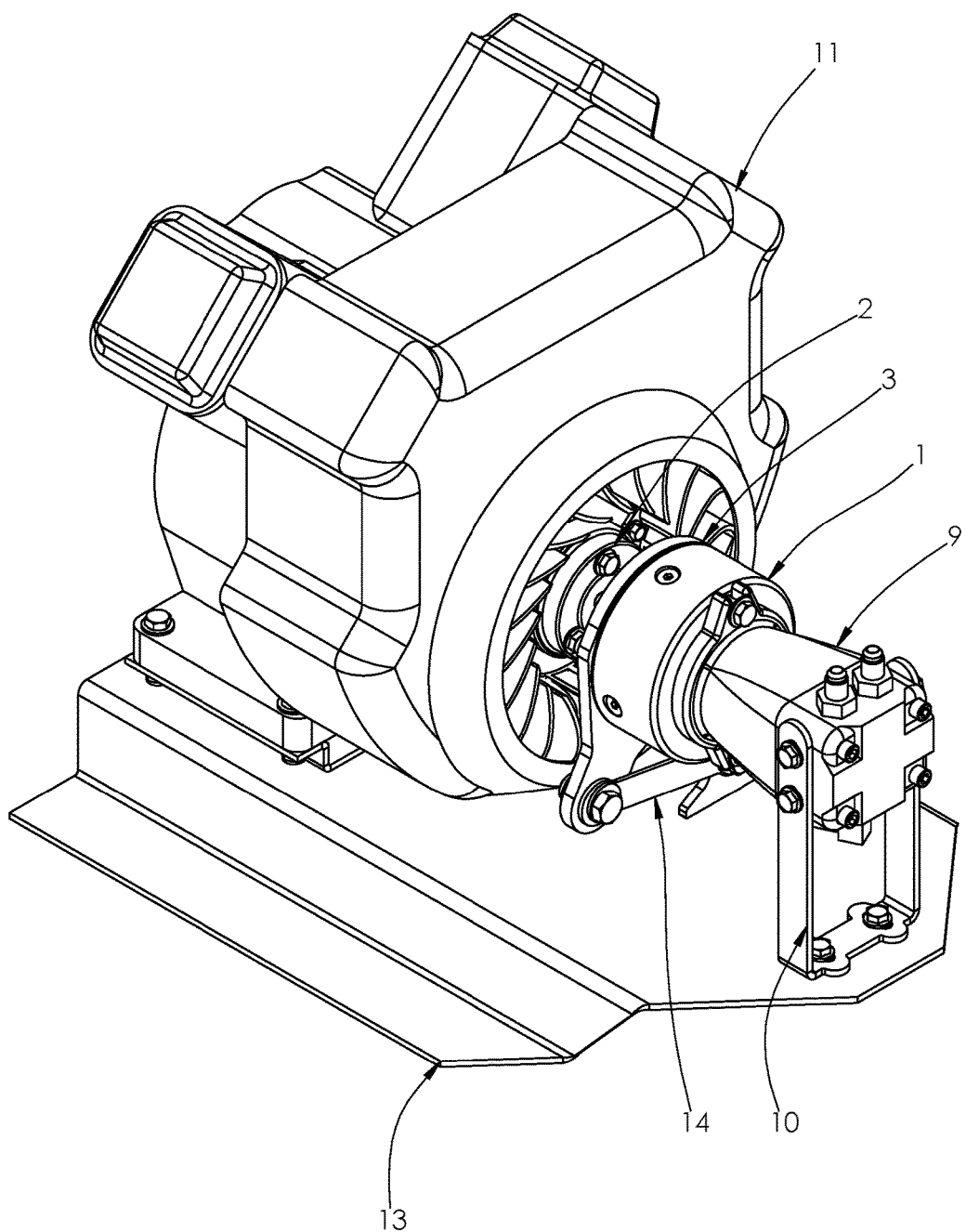
Figure 3:
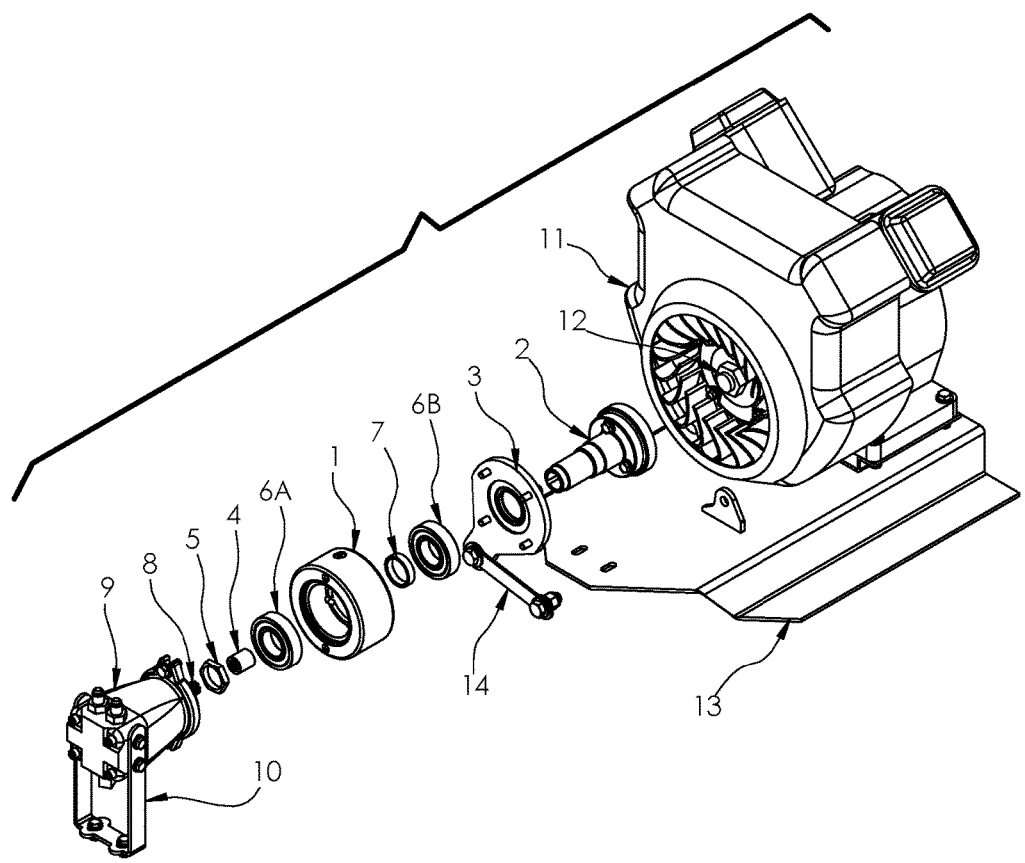
FIGS. 3 and 4 are exploded views of the system of FIGS. 1 and 2, showing various components of the shaft coupling device.
Figure 4:
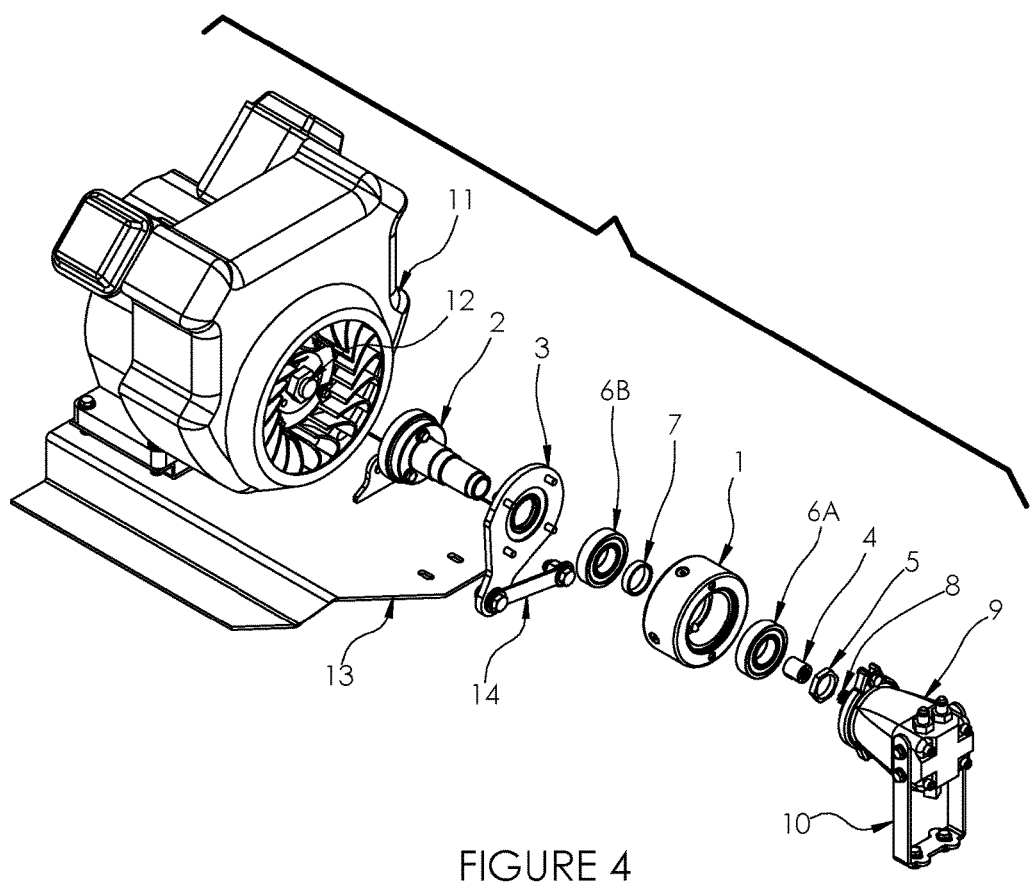

Described herein are embodiments of devices, systems, and methods for coupling two rotational shafts in axial alignment with each other. While the disclosed technology is applicable for coupling any two shafts in axial alignment, the following disclosure focuses mainly on selected exemplary embodiments relating to the coupling of a pump shaft to a stub shaft of an engine in the setting of a utility vehicle or power tool device. In other embodiments, the disclosed coupling systems can, for example, couple a stub shaft of an engine to an alternator, turbo charger, compressor, fan, or other device that is driven by a rotating shaft for input power. The stub shaft from the engine and the device comprising the other shaft can both be mounted on a common platform or base, such as the frame of a vehicle.

FIGS. 1-8 illustrate an exemplary shaft coupling system for coupling the shaft 8 of a hydraulic pump 9 in axial alignment with a secondary engine drive shaft 2, also known as a stub shaft, projecting from an engine 11. The stub shaft 2 can be fixed to the flywheel 12 of the engine 11, for example, and can enable the engine to drive one or more secondary devices (such as the pump 9) when the primary drive shaft of the engine is used to drive one or more primary devices (e.g., used for propulsion of a vehicle and/or used to drive a powered tool). The primary drive shaft is not shown in the Figures, but would project from the opposite side of the engine 11 in axial alignment with the stub shaft 2, which can be said to project from the "back side" of the engine.

Ordinarily, the flywheel can prevent access to the engine block and can prevent mounting and aligning a secondary device, such as a hydraulic pump/pump shaft, with the engine block, as would normally be accomplished with the primary engine drive shaft on the opposite side of the engine from the flywheel. Other engine components, such as a fan, shroud, etc., can also be present near the flywheel and can also limit mounting and aligning a secondary device with the engine block.

In the illustrated embodiment, the engine 11 and the pump 9 are both mounted to a common platform 13, such as a rigid frame of a vehicle or machine. The stub shaft 2 can include a bored piloting hole or recess at the axial end opposite the engine 11 and the other end of the stub shaft can be fixed to the flywheel 12 of the engine, or other component of the engine (e.g., via bolts or welds).

One or more torque transmitting inserts 4 can be inserted into the pilot hole in the stub shaft 2 to transmit the torque from the stub shaft to the pump shaft 8. In alternative embodiments, torque can be transmitted directly from the stub shaft 2 to the pump shaft 8 without the use of the torque transmitting inserts 4, however the inserts can provide manufacturing and assembly advantages. The mating ends of the pump shaft 8 and the stub shaft 2 and/or the inserts 4 can include registration features to couple the shafts in a manner that allows for torque transmission. For example, the inserts 4 can comprise mating splined connectors, with an outer splined connector fixed to the pump shaft and an inner splined connector fixed within the stub shaft. Such splines can alternatively be formed directly in one or both of the shafts to avoid the need for the inserts.

The illustrated shaft coupling system provides for a direct drive power transfer from the engine to the pump, eliminating the need for additional belts, chains, gears, or other intermediate power transmission elements that can cause power losses, take up space, increase the parts count, complicate the assembly process, increase maintenance costs, and increase the risk of failure and down time.

Figure 6:
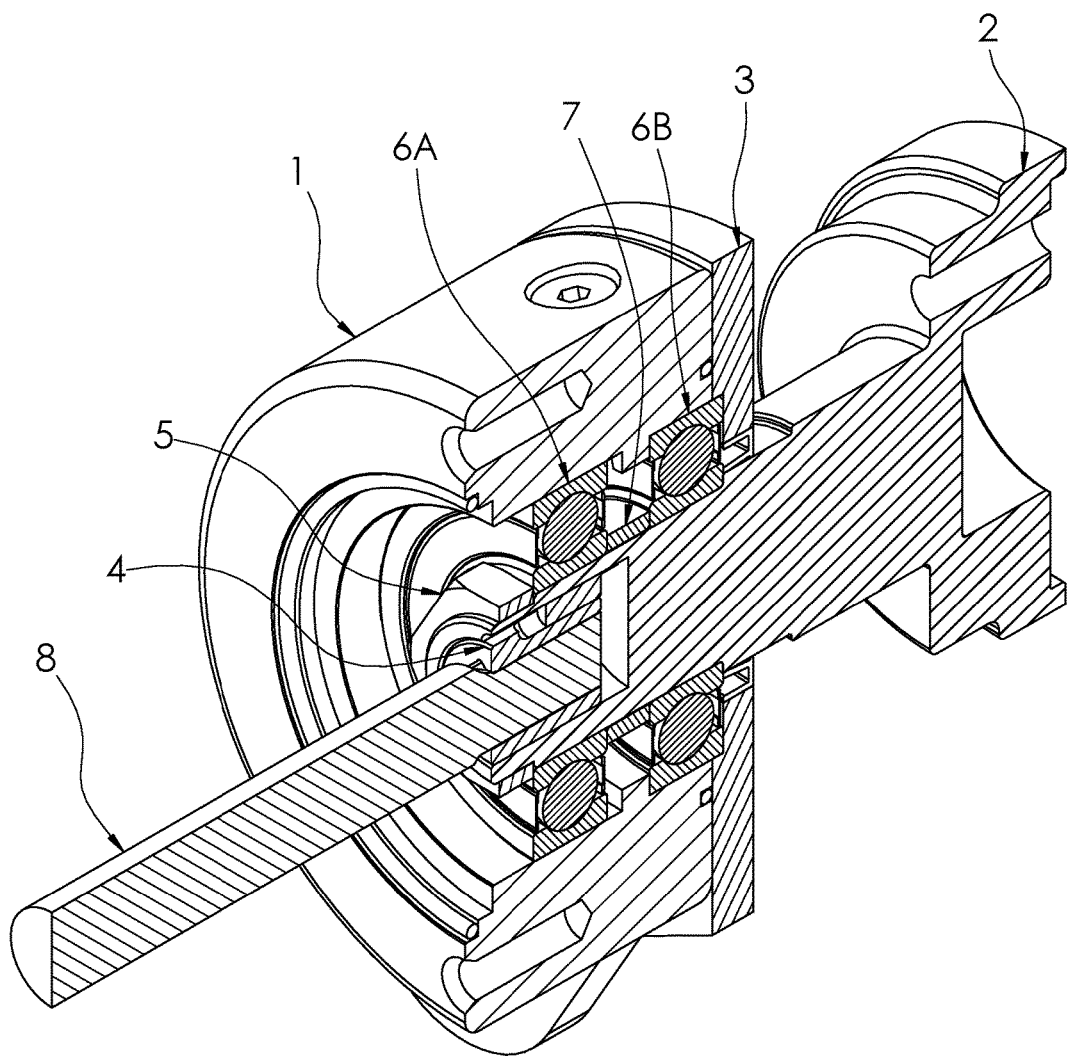
FIG. 6 is a cross-sectional perspective view of the shaft coupling device.

As shown in FIG. 6 and other Figures, a mounting housing 1 is positioned around the juncture between the stub shaft 2 and the pump shaft 8 to maintain the two shafts in the axial aligned direct-drive arrangement while reducing unwanted loading on the shafts. The mounting housing 1 can comprise a single annular body that extends all the way around the shafts, or the mounting housing can comprise two or more individual pieces that are attached (e.g., bolted or welded) together to form a fully annular body. The mounting housing 1 can be positioned with annular bearings 6A and 6B located inside the mounting housing and around the end of the stub shaft 2, such as with a bearing spacer 7 located between the two bearings. Each bearing 6A, 6B can comprise an annular body that allows the stub shaft 2 and pump shaft 8 to rotate relative to the mounting housing 1 but limits axial and radial motion of the shafts relative to the housing. One bearing 6A can be inserted into the housing 1 from the pump side and the other bearing 6B can be inserted into the housing from the engine side. The engine side bearing 6B can be held in axial position relative to the housing 1 by the retainer plate 3, which can be fixed to the axial end of the housing using bolts, for example. The retainer plate 3 can also seal the engine side of housing 1 from external debris. The opposite, pump side of the mounting housing 1 can receive the other bearing 6A. The pump side of the housing 1 can include a piloting relief for the pump housing 9 (see FIGS. 7 and 8) or other structure associated with the shaft 8. The assembled mounting housing 1 with the bearings 6A and 6B, spacer 7, and retainer plate 3 can be moved axially over the stub shaft 2 during assembly so that the housing pilot relief is on the far side (pump side) from the engine 11. A nut 5, or other fastener, can then thread onto the end of the stub shaft 2 to fix the axial position of the mounting housing 1 and the bearings 6A and 6B relative to the stub shaft 2. The outer surface of the end of the stub shaft 2 can include threads, for example, to receive the nut 5 to secure the housing in place on the stub shaft. The nut 5 can also hold the bearing 6A in axial position within the housing 1.

As shown in FIGS. 1-4, an optional connecting arm 14 can be attached between the retainer plate 3 and the platform 13 to fix the radial and rotational position of the mounting housing 1 relative to the platform 13, and thus also relative to the engine 11 and the pump 9. The retainer plate 3 can include a torque arm that extends radially from the housing 1 and attaches to the connecting arm 14, providing enhanced torque resistance for the housing 1.

Figure 7:
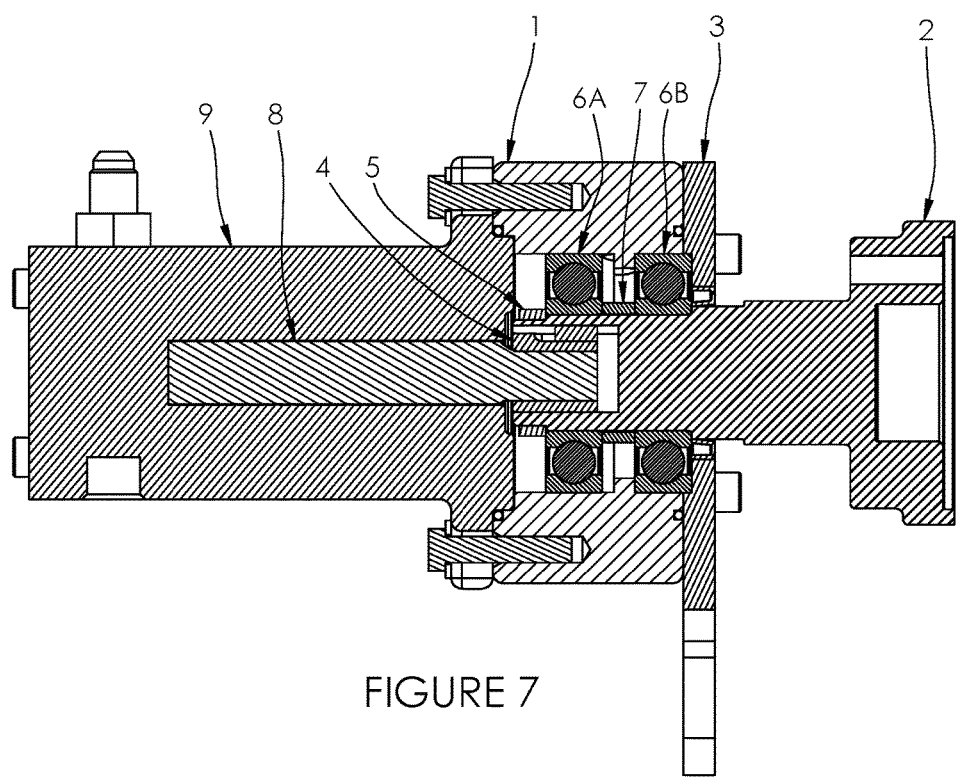
FIG. 7 is a cross-sectional side view of the shaft coupling device with a hydraulic pump coupled to one end of the device.
Figure 8:
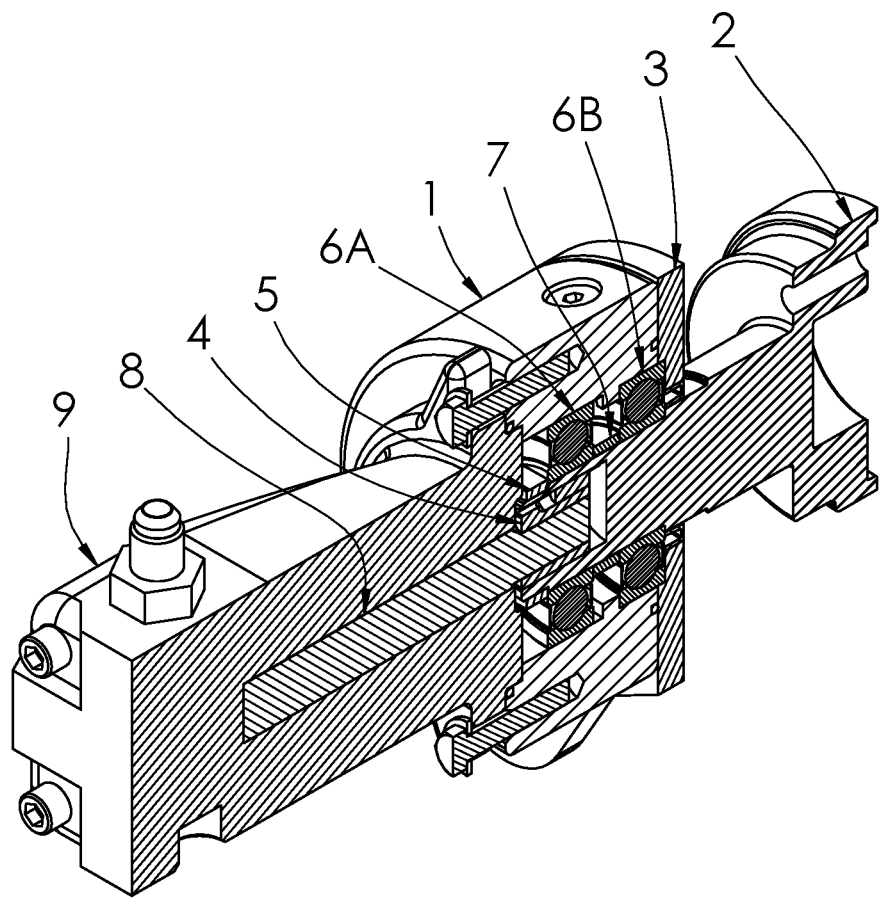
FIG. 8 is a cross-sectional perspective view of the shaft coupling device with a hydraulic pump coupled to one end of the device.

The pump shaft 8 can be piloted into the torque transmitting inserts 4 and/or into the end of the stub shaft 2, and a raised lip on the engine end of the pump housing 9 can pilot into the pilot relief in the mounting housing 1, as shown in FIGS. 7 and 8. The pump 9 can then be fixed to the mounting housing 1 (e.g., with bolts as shown in in FIG. 7), forming a common rigid structure that fixes the pump 9, the housing 1, and the retainer plate 3, and allows rotation of the two shafts 2 and 8 within.

A pump support 10 can be mounted between to the pump housing 9 and the platform 13 to further limit any radial or rotational motion of the pump housing 9 and prevent the weight of the pump from loading either shaft.

Figure 5:
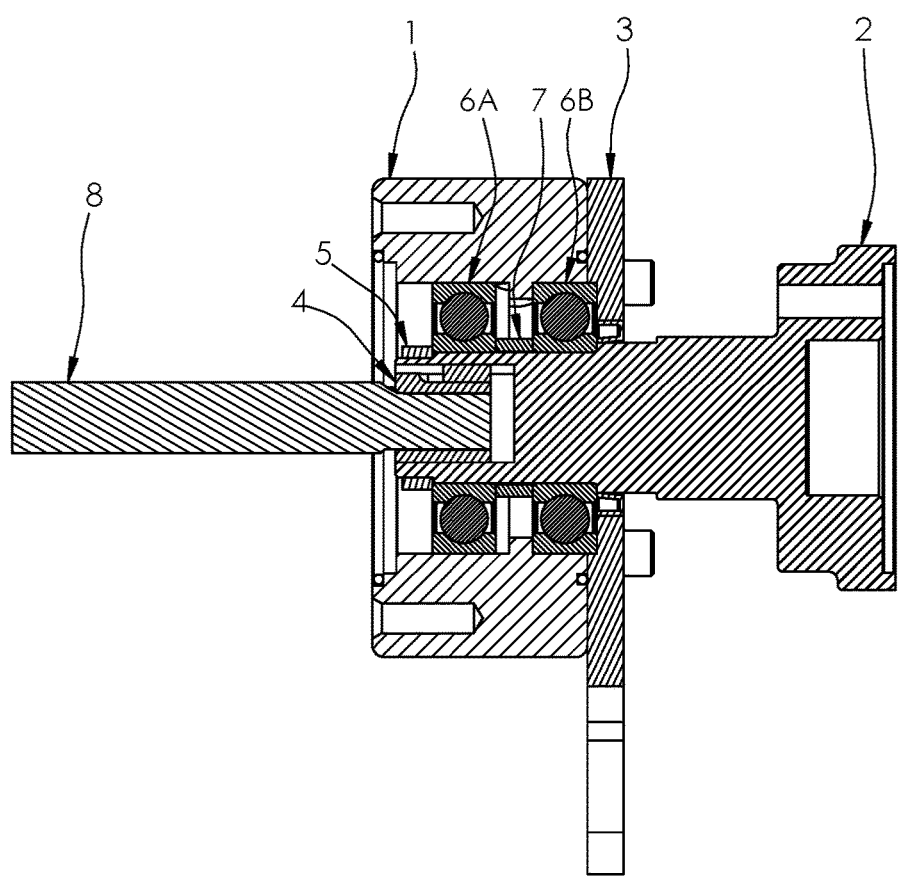
FIG. 5 is a cross-sectional side view of the shaft coupling device.

As shown in FIGS. 5 and 6, the stub shaft 2 can include several axial sections having different outer diameters with axial facing ledges transitioning between each adjacent section. For example, a largest diameter section can be adjacent to the connection to the flywheel 12 and the stub shaft 2 can gradually step down in diameter at each section moving toward the opposite end coupled to the pump shaft 8. For example, the bearings 6A, 6B can be mounted around an intermediate diameter section while the retainer plate 3 is mounted around a larger diameter section and the nut 5 is mounted around a smaller diameter section.

In an alternative embodiment, the pump shaft 8 can be piloted and the stub shaft 2 can have a smaller diameter end portion that is inserted or piloted into a recess in the pump shaft. In such an embodiment, a reversed, mirror image version of the coupling mechanism can be used, with the bearings, retainer plate, and nut all mounted on the outer surface of the pump shaft instead of the stub shaft.

In alternative embodiments, the retainer plate 3 can be separated into one component that is attached to the housing 1 to form an axial cover or limiter, and another component that is coupled to the connector arm 14 and acts as a torque arm to couple the retainer plate and housing to the platform 13.

In alternative embodiments, any number of bearings can be used to mount the housing 1 around the shafts. For example, three or more bearings can be used. The bearings can also be unified as a single component or housed within a unitary bearing housing to provide desired relative spacing between the bearings.

In alternative embodiments, the engine 11, housing 1, and pump 9 can be fixed to two or more different platforms or base structures, and the different base structures can be arranged and coupled in a manner that fixes their relative motions.

In some embodiments, the disclosed engine 11 and pump 9 are mounted to the frame of a tracked or wheeled utility vehicle, such as a trenching machine, tiller, stump grinder, or front loader. In some such embodiments, the pump 9 can be used to power hydraulic systems in the vehicle, such as main powered tool and/or arms that raise and lower the main powered tool.

Figure 9:
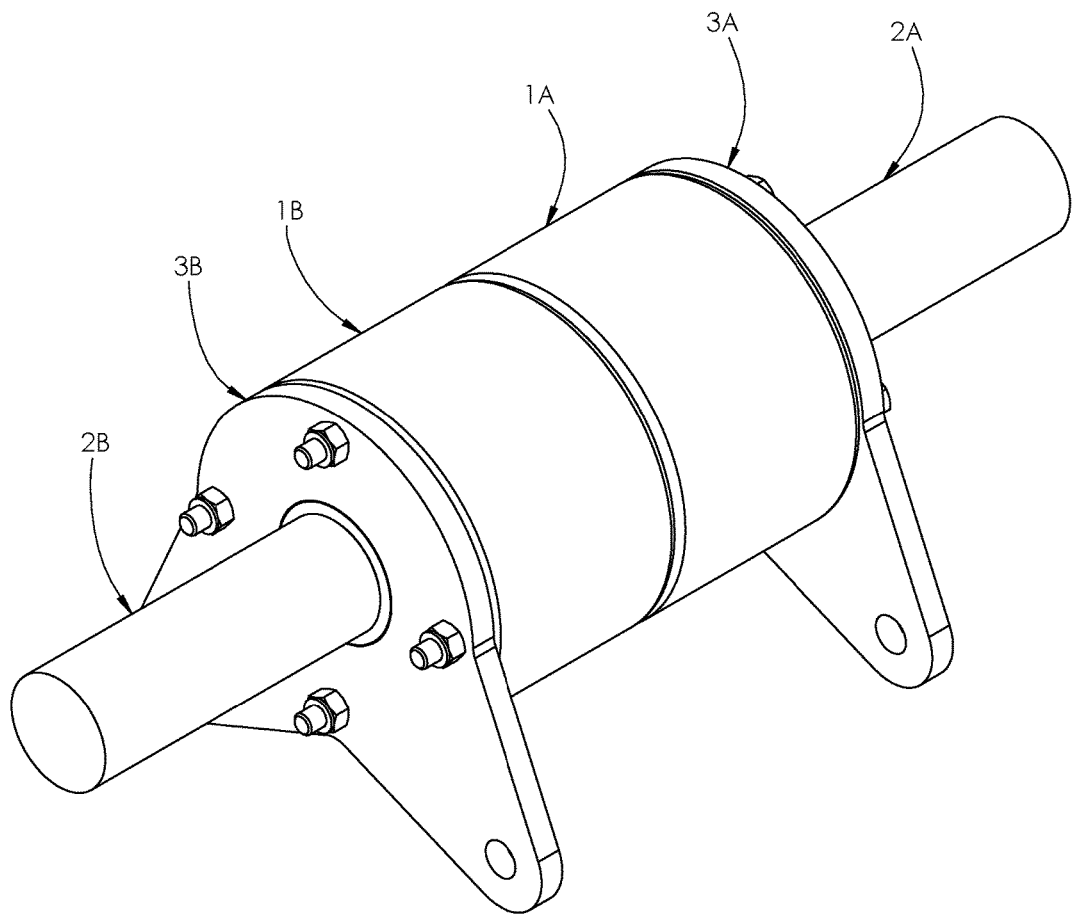
FIG. 9 is a perspective view of another exemplary shaft coupling device.
Figure 10:
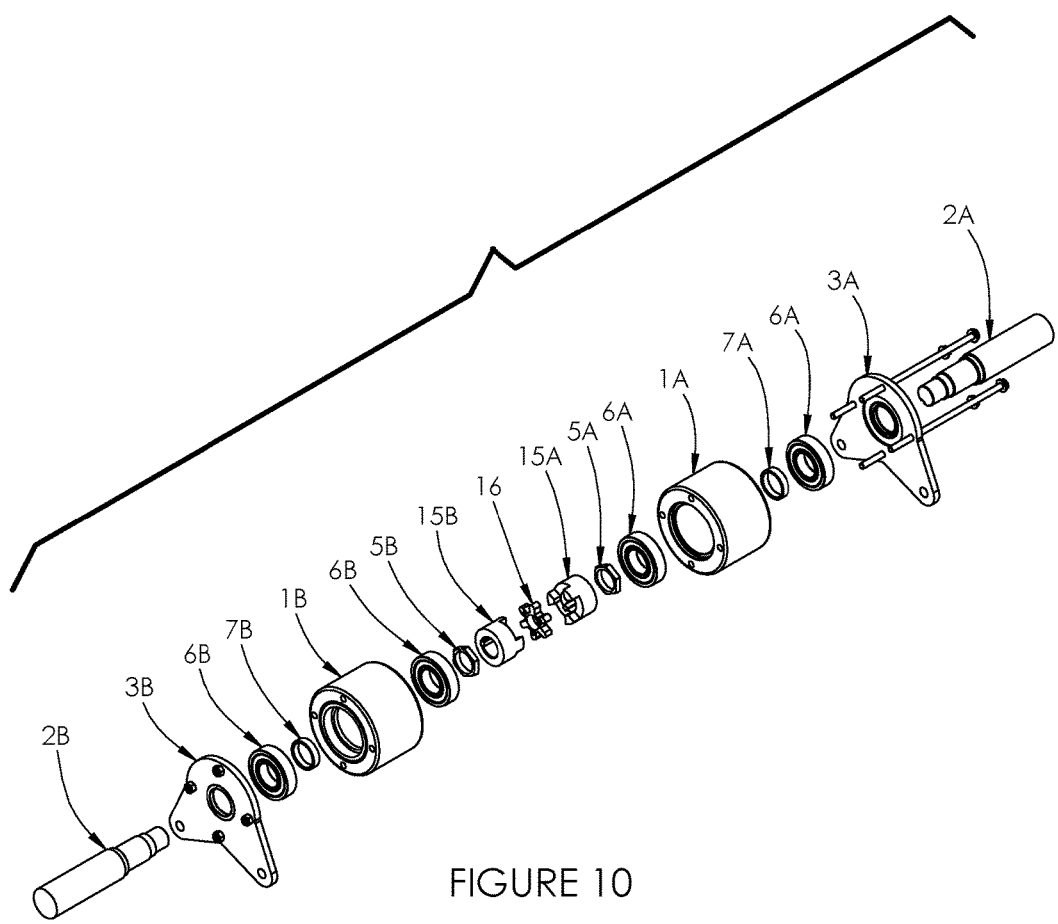
FIG. 10 is an exploded perspective view of the shaft coupling device of FIG. 9.

Another exemplary shaft coupling system is shown in FIGS. 9 and 10. In FIGS. 9 and 10, all parts with the same reference number represent an analogous feature and/or serve the same function as in the embodiment of FIGS. 1-8, and the letters A and B are added to distinguish two similar elements on opposite sides of the device. The shaft coupling device shown in FIGS. 9 and 10 can be used to couple two similarly sized shafts, 2A and 2B, in axial alignment. Mounting housings 1A and 1B, generally as described above with housing 1, are attached to each shaft 2A, 2B. Each mounting housing 1A, 1B can have either a male or female piloting end so that the two housings can pilot together to fix motions relative to each other. Each mounting housing 1A, 1B can be axially fixed to its respective shaft 2A, 2B with a nut 5A, 5B, as described above with nut 5. A torque coupler (e.g., elements 15A, 16, 15B) can be fixed to the ends of two shafts 2A, 2B to transfer torque between them. The mounting housings 1A, 1B can be piloted together and fixed to each other, with the couplers 15A, 15B fitting inside the mounting housings. Bearings similar to the bearing 6A, 6B described above can be positioned inside the housings 1A, 1B to allow rotation of the shafts 2A, 2B within the housings while preventing radial misalignment. The torque arms 3A, 3B can be coupled to the opposing ends of the housings and can be used to support the shafts and housings against radial and axial motion, and to prevent the mounting housing from spinning about the shaft axis. In FIG. 10, elements 15A, 15B, and 16 represent an exemplary jaw type torque coupler, though other types of torque couplers can alternatively be used. For example, a gear type torque coupler or a flex type torque coupler can alternatively be included.

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Integers, materials, characteristics and other features described in conjunction with a particular aspect, embodiment, or example of the disclosed technology are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods.

As used herein, the terms "a", "an", and "at least one" encompass one or more of the specified element. That is, if two of a particular element are present, one of these elements is also present and thus "an" element is present. The terms "a plurality of" and "plural" mean two or more of the specified element. As used herein, the term "and/or" used between the last two of a list of elements means any one or more of the listed elements. For example, the phrase "A, B, and/or C" means "A", "B,", "C", "A and B", "A and C", "B and C", or "A, B, and C." As used herein, the term "coupled" generally means physically coupled or linked and does not exclude the presence of intermediate elements between the coupled items absent specific contrary language.

In view of the many possible embodiments to which the principles of the disclosed technology may be applied, it should be recognized that the illustrated embodiments are only examples and should not be taken as limiting the scope of the disclosure. Rather, the scope of this disclosure is at least as broad as the following claims. Accordingly, we claim all that comes within the scope of the following claims.

The invention claimed is:

1. A system for coupling two rotational shafts in axial alignment, the system comprising:
   a stub shaft coupled to an engine such that the engine drives rotation of the stub shaft, the stub shaft having a first free end extending away from the engine;
   an output shaft having a second free end piloted within the first free end of the stub shaft such that the stub shaft and the output shaft are axially aligned and share a common rotation axis, and such that the stub shaft transfers torque from the engine directly to the output shaft;
   an annular housing positioned around the first free end of the stub shaft and the second free end of the output shaft;
   at least one rotational bearing positioned within the annular housing and around the first free end of the stub shaft, wherein the annular housing and at least one rotational bearing permit rotation of the stub shaft and the output shaft about the common rotation axis while restricting motion of the stub shaft and the output shaft perpendicular to the common rotation axis;
   a fastener attached to the first free end of the stub shaft, wherein the fastener fixes the axial position of the annular housing relative to the stub shaft; and
   an output device positioned around the output shaft and fixedly coupled to the annular housing, wherein the output device operable to utilize torque from the output shaft to produce a functional output.

2. The system of claim 1, wherein the engine, the annular housing, and the output device are rigidly coupled to a common rigid support structure.

3. The system of claim 1, wherein the output device comprises a pump device.

4. The system of claim 1, wherein the stub shaft is fixed to a flywheel of the engine.

5. The system of claim 1, wherein the stub shaft extends from a back side of the engine, in an opposite direction from a primary drive shaft of the engine.

6. The system of claim 1, wherein the at least one rotational bearing comprises two annular rotational bearings spaced axially from each other.

7. The system of claim 6, further comprising an annular spacer positioned around the stub shaft between the two annular rotational bearings.

8. The system of claim 1, wherein the first free end of the stub shaft has a greater diameter that the second free end of the output shaft.

9. The system of claim 1, further comprising a retainer plate positioned around the stub shaft between the engine and the annular housing, wherein the retainer plate is coupled to the annular housing and retains the at least one rotational bearing within the annular housing.

10. The system of claim 9, wherein the retainer plate includes a torque arm that is coupled to a fixed base structure such that the torque arm prevents the annular housing from rotating relative to the fixed base structure.

11. The system of claim 1, wherein the first free end of the stub shaft comprises a pilot recess, and the system further comprises at least one torque transmitting insert positioned inside the pilot recess, wherein the at least one torque transmitting insert is configured to transfer torque from the stub shaft to the output shaft.

12. The system of claim 11, wherein the at least one torque transmitting insert comprises mating splined connectors, including an outer splined connector fixed to the output shaft and an inner splined connector fixed within the stub shaft.

13. The system of claim 1, wherein the annular housing comprises a piloting relief on an axial end of the annular housing facing the output device, wherein the piloting receive is shaped to fitting receive a corresponding portion of the output device.

14. A vehicle comprising the system of claim 1, wherein the system transmits a portion of torque generated by a primary engine of the vehicle to a secondary output device of the vehicle.

15. The vehicle of claim 14, wherein the secondary output device comprises a hydraulic pump.

16. The vehicle of claim 14, wherein the output shaft and stub shaft are axially aligned with, and rotate in synch with, a primary drive shaft of the engine.

\* \* \* \* \*